United States Patent [19]

Kunze

[11] 4,242,558
[45] Dec. 30, 1980

[54] DEVICE FOR BREAKING OFF THE WIRE-LIKE OR STRIP-LIKE ELECTRODE IN AN ELECTRO-EROSION MACHINE

[75] Inventor: Karl Kunze, Munich, Fed. Rep. of Germany

[73] Assignee: Siemens Aktiengesellschaft, Berlin & Munich, Fed. Rep. of Germany

[21] Appl. No.: 968,176

[22] Filed: Dec. 11, 1978

[30] Foreign Application Priority Data

Dec. 14, 1977 [DE] Fed. Rep. of Germany ....... 2755740

[51] Int. Cl.³ .............................................. B23P 1/00
[52] U.S. Cl. ................................... 219/69 W; 83/355; 83/884; 83/926 B
[58] Field of Search .................... 219/69 W, 69 M; 83/926 B, 355, 884

[56] References Cited

U.S. PATENT DOCUMENTS

| 3,651,726 | 3/1972 | Laroche | 83/355 |
| 3,822,374 | 7/1974 | Ullmann et al. | 219/69 W |
| 4,084,074 | 4/1978 | Gilleland et al. | 219/69 W |

FOREIGN PATENT DOCUMENTS 616630  3/1961  Canada ..................................... 83/355

Primary Examiner—C. C. Shaw
Attorney, Agent, or Firm—Hill, Van Santen, Steadman, Chiara & Simpson

[57] ABSTRACT

A device is disclosed for breaking off the wire-like or strip-like consumed electrode in electro-erosion machines for the processing of workpieces. At a delivery side of the device the consumed electrode is moved by feed rollers into a gap between the surface of an anvil and a multi-edge bit which rotates in front of this surface and is driven by the feed rollers. The rotating bit edges groove the electrode on the anvil surface to cut it into small pieces which fall into a collector container.

7 Claims, 4 Drawing Figures

DEVICE FOR BREAKING OFF THE WIRE-LIKE OR STRIP-LIKE ELECTRODE IN AN ELECTRO-EROSION MACHINE

BACKGROUND OF THE INVENTION

The subject of the invention is a device for breaking off the wire-like or strip-like electrode for an electro-erosion machine, wherein the electrode is supplied from the feed side and at the delivery side is deposited behind the workpiece which is to be processed.

Wire erosion machines, in particular those which are numerically controlled, can be used very advantageously for cutting complicated outer or inner contours on electrically conductive workpieces. As is known, during the processing operation wire-like or strip-like electrodes and workpieces move relative to one another. See U.S. Pat. No. 3,822,374 incorporated herein by reference. The electrode is drawn off from a feed roller, moves past the workpiece which is to be processed and passes through a drive device which consists of a pair of rollers which imparts a uniform feed motion to the electrode. Finally the electrode is rewound onto a roller and deposited. In the case of the known take-up roller, at the delivery side the electrode which is no longer to be used is wound up. This has the disadvantage that the roller must be changed when it is full. Moreover during the erosion process the electrode is subjected to such stress and deformation that loop formations and tangling can occur on the roller during the wind-up process.

It is already known to provide, at the delivery side, a cutting device which cuts the electrode into small pieces with the aid of a mechanical or magnetically moving blade and causes the pieces to fall into a collector container. See U.S. Pat. No. 3,822,374. However, this known cutting device does not operate reliably and therefore is unsuitable for automatic operation at night or on weekends. The cutting process cannot be carried out reliably since the electrodes, which consists of high-grade copper, produce deposits on the cutting tool and cause the workpiece to become smeared. In addition, the cutting tool is also subject to heavy wear. If the electrode is not cut off, hold-ups occur in the discharge of the electrode at the delivery side which lead to short-circuits and to the breakdown of the machine.

SUMMARY OF THE INVENTION

An object of the invention is to provide a device for cutting off the wire-like or strip-like electrode which reliably cuts the electrode into small pieces at the delivery side.

In the invention, at the delivery side there are provided feed rollers which serve to advance the electrode. The feed rollers are followed by an anvil and by a rotatable, multi-edge bit which is in front of the surface of the anvil and is driven by the feed rollers. The electrode can be inserted via the feed rollers into the gap between the surface of the anvil and the rotatable bit, and the rotating bit edges groove the electrode on the anvil surface.

The fundamental principle of the mode of operation of the new device consists in grooving rather than cutting the electrode at the delivery side. The new device operates reliably and is suitable for automatic operation of an electroerosion machine by day and night and also over the weekend. No hold-ups occur during the discharge of the electrode. The device is simple and can be installed into a housing provided with an inlet opening for the electrode and an outlet opening for the fragmented electrode pieces. Thus it can be subsequently installed into known, commercially available wire erosion machines in a simple fashion. The requisite movement of the feed rollers and of the bits is derived from the guide and drive system for the electrode.

Details of the invention will be explained in the form of an advantageous exemplary embodiment which is illustrated in the Figures. The illustration has been partially simplified. Particular structural details of the wire erosion machine with which the expert will be familiar and which are not closely related to the invention have been omitted for reasons of simplification and clarity.

DESCRIPTION OF THE PREFERRED EMBODIMENTS

Figure 1:
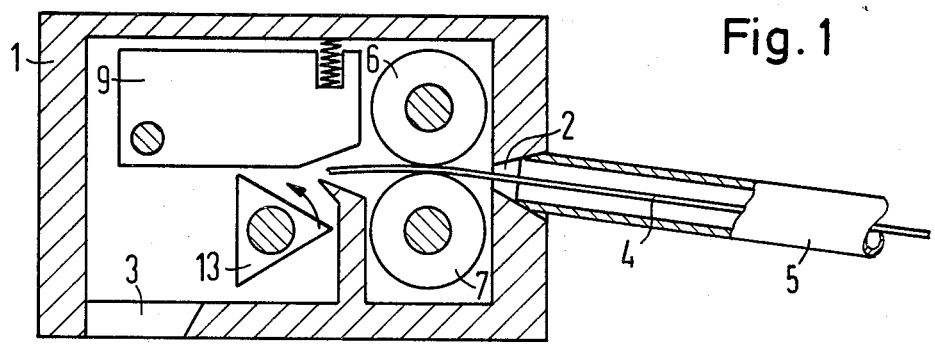
FIGS. 1 to 4 illustrate by a cross-sectional view through the device of the invention the mode of operation based upon a time sequence for break off of one piece of the electrode. A different point in time has been illustrated in each Figure.
Figure 2:
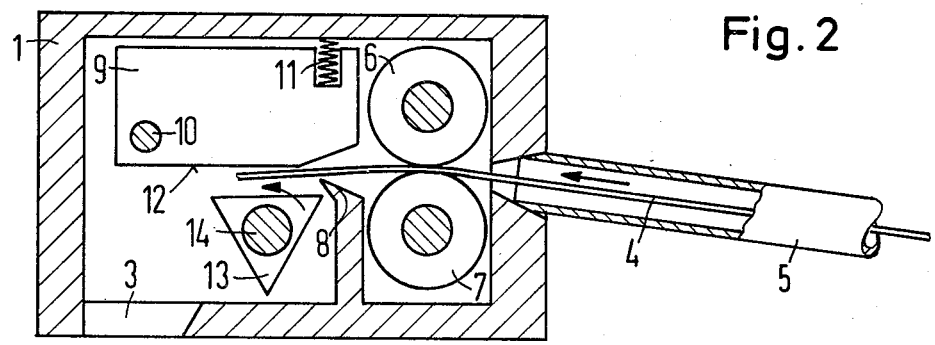

FIGS. 1 to 4 illustrate a housing 1 provided with an inlet opening 2 into which the wire-like electrode 4 is introduced and with an outlet opening 3 from which the electrode, broken into small pieces, falls and is collected in a collector container which is located beneath the opening but has not been illustrated in the drawing. The two feed rollers 6 and 7, a guide plate 8, an anvil 9 and a bit which is rotatably mounted in front of the surface 12 of the anvil are provided in the housing.

Figure 3:
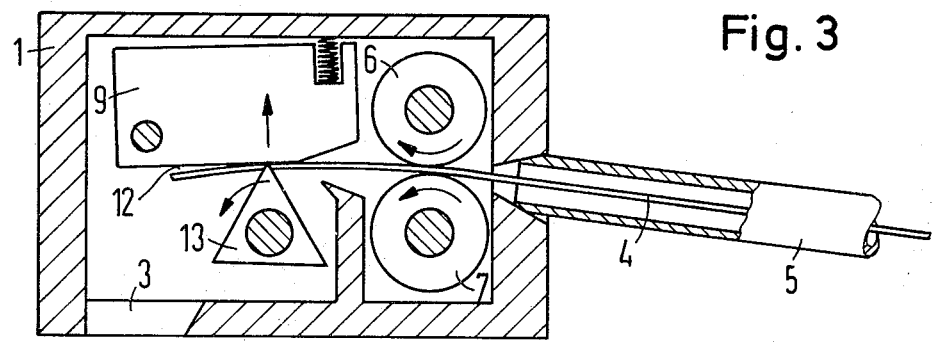
Figure 4:
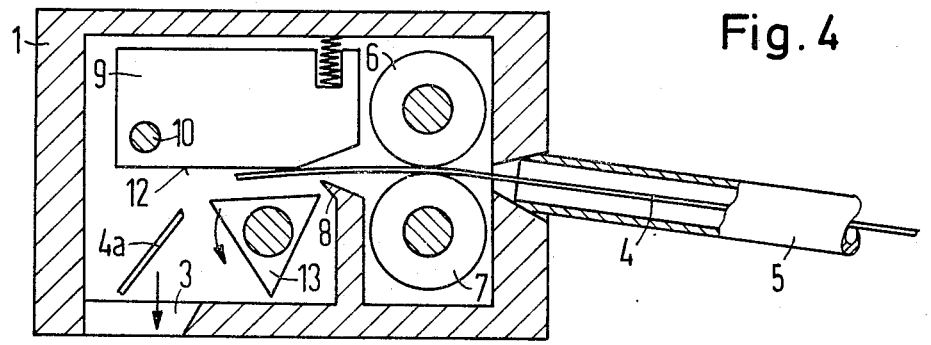

Via the supply tube 5 the electrode 4, which is moved forwards by the drive and guide system arranged behind the workpiece, passes between the two feed rollers 6 and 7. The two feed rollers press against one another in spring-like fashion and are driven in opposing directions. Their periphery is provided with a slightly toothed profile to prevent the electrode from slipping through. In an advantageous embodiment of the invention the feed rollers are moved at a somewhat greater speed, for example 5%, than the feed of the electrode 4 introduced into the drive opening 2. As a result the supplied wire electrode is subject to tensile stress, and obstructions in the supply tube 4 are avoided. Behind the feed rollers is arranged a guide plate 8 to ensure that the electrode is reliably brought to the surface 12 of the anvil. The anvil 9 is mounted so as to be pivotable about the axis 10 and is pressed in the direction of the rotating bit by the spring force of the spring 11. At the supply side the anvil is slightly bevelled to enable the electrode to be reliably brought to the surface. The bit 13 is mounted so as to be rotatable on the axis 14 and is driven via the feed rollers. Advantageously the bit possesses three edges, forming a trihedral. The bit rotates in the direction of the arrow. The edges of the bit are consecutively pressed against the electrode arranged on the surface 12 of the anvil and groove the electrode (FIG. 3). The anvil is now pressed in the direction of the housing 1 against the spring force of the spring 11 and the wire is grooved without cutting completely through. As a result of the rotary movement of the bit, the grooved portion 4a of the electrode which for example is approximately 15 mm long is torn off and pushed away and falls in the direction of the outlet opening 3 (FIG. 4). When the edge of the bit has been moved past the surface 12, the anvil 9 rotates back to the starting position as a result of the force of the spring 11.

In an advantageous embodiment of the invention the speed of rotation of the bit is somewhat greater than that of the feed rollers, for example 25% greater. This ensures that the grooved portions 4a of the electrode jump away following the grooving process.

Advantageously a manually adjustable sliding roller, which has not been illustrated in the Figures, adjusts the run-in point of the feed rollers and the grooving point of the bit in the axial direction. As a result the feed rollers and the bit can be continuously used at different positions so that wear phenomena do not immediately lead to the need to change the relevant component. This advantage can also be achieved by designing the inlet opening 2 as a horizontal slot and arranging the supply tube 5 to be displaceable in the lateral direction along the slot.

In order to reliably prevent copper deposits on the bit edges, it is advantageous to provide a stripper plate (not shown in the Figure) across which the edges of the bit are moved.

In the case of an automatic threading process, the electrode is moved through the supply tube 5 by the drive and guide system until it is gripped by the feed rollers 6 and 7 and conveyed onwards to the grooving position.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A device for breaking off a wire-like or strip-like electrode for an electro-erosion machine wherein the electrode is supplied from a feed side of the device and at a delivery side of the device is deposited behind a workpiece being processed by the electro-erosion machine, comprising: feed roller means having drive rollers at the delivery side for advancing the electrode; an anvil following the feed roller means; a rotatable bit means having a grooving edge and which is adjacent a surface of the anvil; said feed roller means inserting the electrode into a gap between the surface of the anvil and the rotatable means; the rotating bit means grooving the electrode on the anvil surface; the anvil being deflectable and means being provided for biasing a surface of the anvil towards the bit means to cooperate with the bit means for said grooving so as to prevent cutting completely through the grooved electrode at the groove by the bit means; and a peripheral speed of the grooving edge being greater than a peripheral speed of the drive rollers of the feed roller means so as to cause a grooved piece of the electrode to be torn off at the grooves and jump away.

2. A device as claimed in claim 1 wherein a peripheral speed of the drive rollers of the feed roller means is greater than a supply speed of the electrode.

3. A device as claimed in claim 1 wherein a peripheral speed of the bit means has a plurality of grooving edges.

4. A device as claimed in claim 3 wherein the bit means comprises a rotatable trihedral.

5. A device as claimed in claim 1 wherein the anvil is arranged to be pivotable, and that the surface of the anvil is biased in the direction of the rotating bit means as a result of the action of a spring.

6. A device as claimed in claim 1 wherein a guide plate means is provided which guides the electrode into the gap formed between the surface of the anvil and the rotating bit means.

7. A system for breaking off a wire-like electro-erosion machine electrode, comprising:
   a wire-like electro-erosion machine electrode;
   a rotatable bit having a grooving edge;
   a deflectable anvil having a surface positioned to cooperate with the grooving edge to groove the electrode;
   means bearing the anvil surface toward the grooving edge to permit the grooving edge to groove but not completely cut through the electrode; and
   means for rotating the bit at a speed greater than a feed speed of the electrode so as to tear off a piece of the electrode at the roove.

* * * * *